No. 637,102. Patented Nov. 14, 1899.
W. J. EVANS.
DRILL FORGING AND SHARPENING MACHINE.
(Application filed Mar. 7, 1899.)
(No Model.) 2 Sheets—Sheet 1.
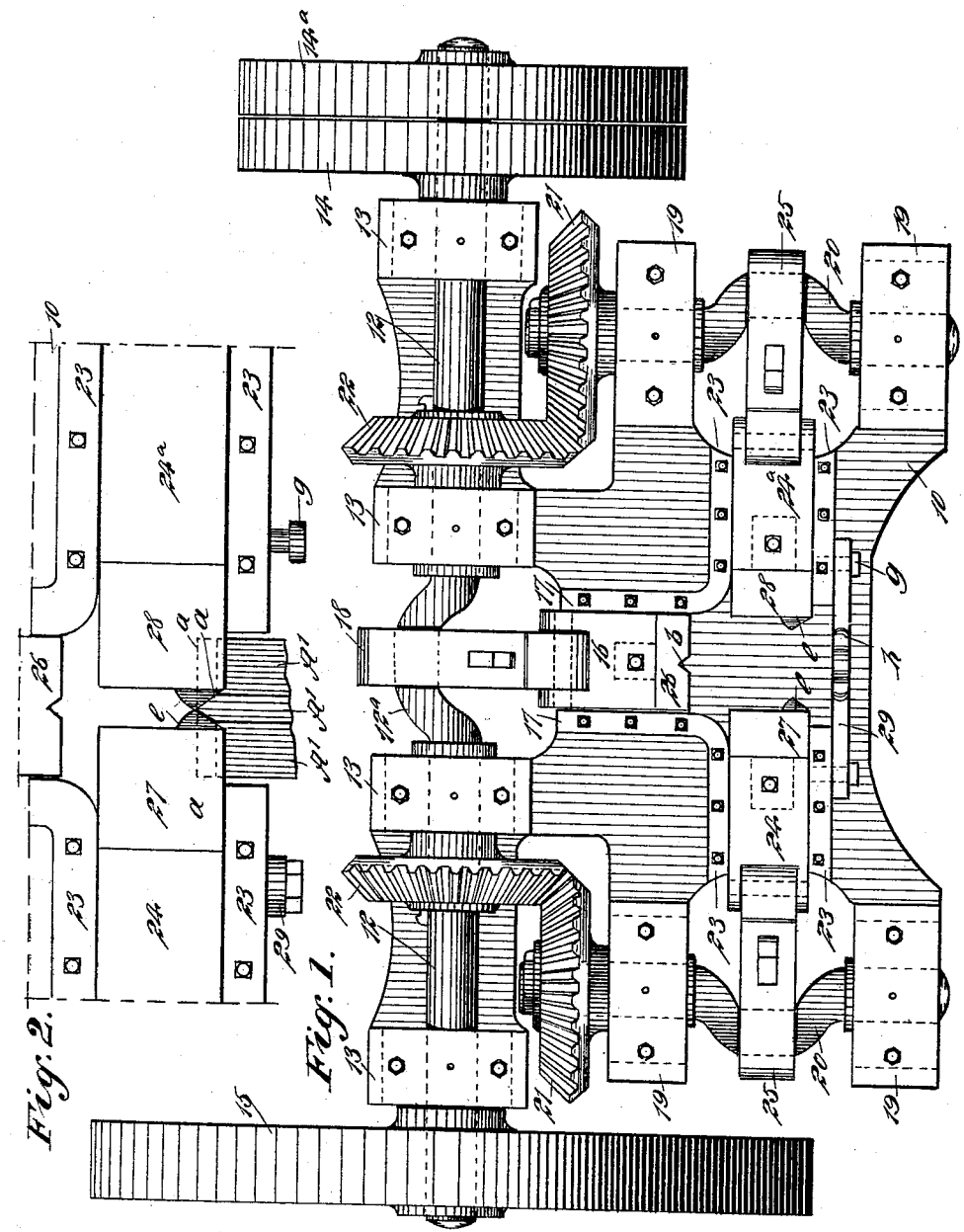
WITNESSES:
INVENTOR
William J. Evans.
BY
ATTORNEYS.

No. 637,102. Patented Nov. 14, 1899.
W. J. EVANS.
DRILL FORGING AND SHARPENING MACHINE.
(Application filed Mar. 7, 1899.)
(No Model.) 2 Sheets—Sheet 2.
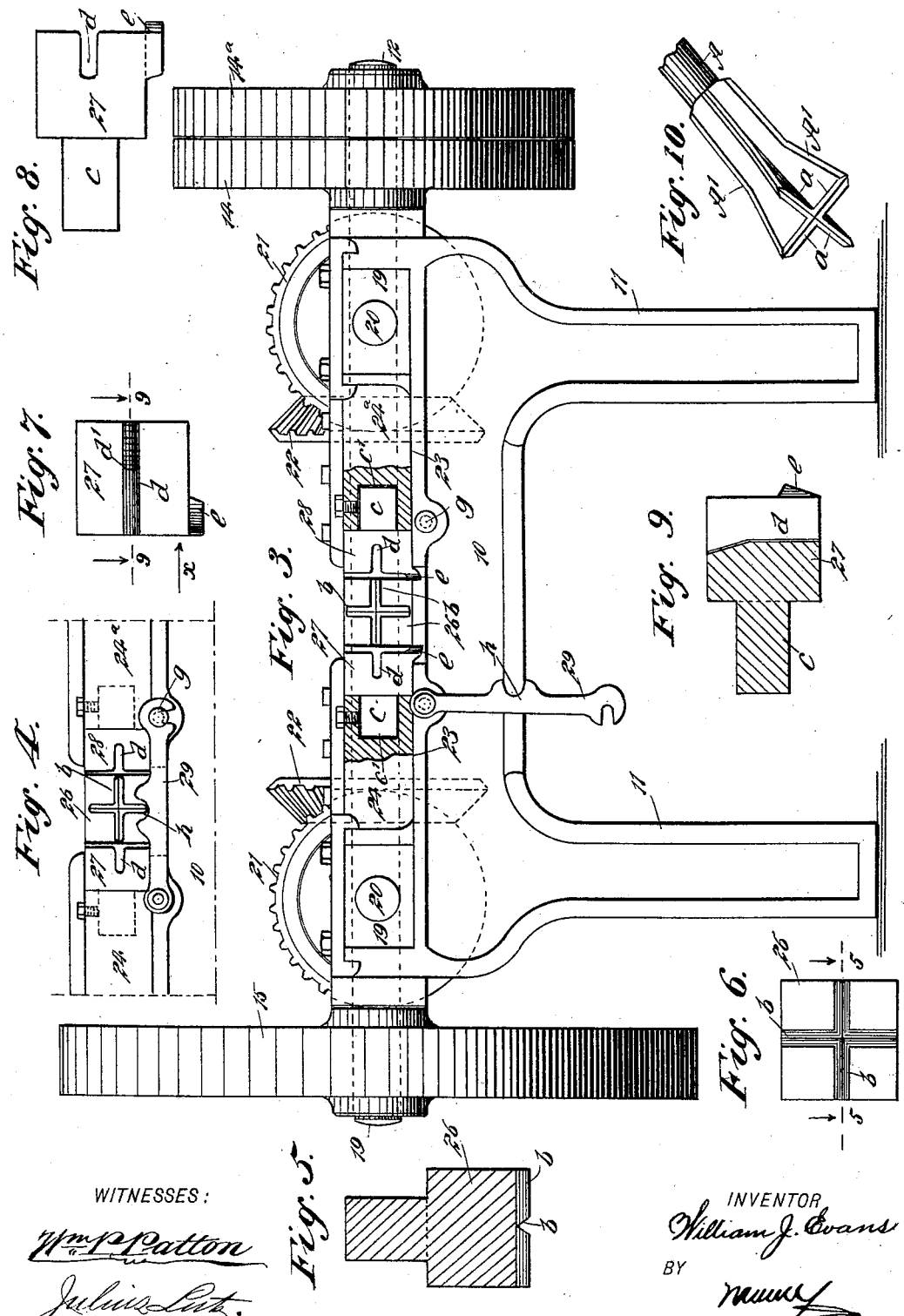
WITNESSES:
INVENTOR
William J. Evans
BY
ATTORNEYS.

UNITED STATES PATENT OFFICE.

WILLIAM J. EVANS, OF BUTTE, MONTANA.

DRILL FORGING AND SHARPENING MACHINE.

SPECIFICATION forming part of Letters Patent No. 637,102, dated November 14, 1899.

Application filed March 7, 1899. Serial No. 708,115. (No model.)

*To all whom it may concern:*

Be it known that I, WILLIAM J. EVANS, of Butte city, in the county of Silver Bow and State of Montana, have invented a new and Improved Drill Forging and Sharpening Machine, of which the following is a full, clear, and exact description.

This invention relates to means for forging rock-drills and resharpening the same, and has for its object to provide a novel device of the character indicated which will afford convenient and reliable means for rapidly shaping the drill-body near its cutting edges and renewing said cutting edges when dulled by use.

The invention consists in the novel construction and combination of parts, as is hereinafter described, and defined in the claims.

Reference is to be had to the accompanying drawings, forming a part of this specification, wherein similar characters of reference indicate corresponding parts in all the figures.

Figure 1 is a plan view of the device. Fig. 2 is an enlarged fragmental plan view showing the application of the device for renewing the cutting edges of a blunt drill. Fig. 3 is a partly-sectional front elevation of the machine. Fig. 4 is a fragmental front view showing a different adjustment of a drill-support which is a feature of the invention. Fig. 5 is an enlarged sectional plan view of an edge-forming die that is a detail of the improvement, taken on the line 5 5 in Fig. 6. Fig. 6 is a front end view of the edge-forming die, which in service sharpens the cutting edges of a rock-drill. Fig. 7 is an enlarged end face view of one of a pair of drill-forming dies that are novel details of construction. Fig. 8 is a detached front side view of one of the drill-forming dies. Fig. 9 is a sectional plan view of one of the drill-forming dies, taken on the line 9 9 in Fig. 7; and Fig. 10 is a perspective view of the cutting end portion of a rock-drill.

The rock-drill upon which the improved machine is particularly designed to form cutting edges is a well-known form of such bits and comprises a shank A, having four wings A', that project at right angles laterally from the shank and terminate in V-shaped cutting edges *a*, as clearly indicated in Fig. 10.

The material from which the four bits or wings of the drill are formed may be of steel-bar material rolled into cruciform shape, a bit end of suitable length being usually cut from the material and welded at one end upon a drill-shank, such as is indicated partially in Fig. 10.

In rock-drilling for efficient service the wings of the drill must be widened near the cutting edges of the same to afford necessary clearance for the free working of the drill in the bore or hole it is producing. When drilling in hard rock, the cutting edges of a winged drill quickly become dulled, and the drill must be resharpened. Usually a number of drills of suitable dimensions at their cutting edges are supplied, so that a sharp drill may be at once substituted for the dull one and loss of time be avoided. The drills must be kept of exactly the same width where they engage the rock-bed as the work of drilling a deep hole progresses, and if this work is manually effected in the usual way each repair of a drill consumes considerable time and labor.

In the improved machine I have devised new drills may be rapidly forged to have exactly the same dimensions where they are widened to form cutting edges, and these edges on new or dulled drills may be effectively sharpened in a very expeditious manner.

Referring to the drawings that represent a practical embodiment of my invention, 10 indicates the bed plate or frame of the device, supported at a convenient height by a suitable number of legs 11, only two of which are represented in Fig. 3. A main shaft is supported to rotate above the bed-plate 10 by pedestal-boxes 13, and at one end of said shaft fast and loose pulleys 14 14$^a$ are positioned thereon, a balance-wheel 15 being affixed at the opposite end of said shaft.

A slide-block 16, mounted to reciprocate in or on guideways 17, is located at a proper distance in front of the main shaft 12 upon the bed-plate 10 and at about the longitudinal center of the latter. A double crank 12$^a$ is formed or secured upon the main shaft 12, opposite the slide-block 16, and is loosely connected to the slide-block by the pitman 18, whereby the slide-block is adapted to receive slidable movement when the shaft 12 is revolved. Near each end of the bed-plate 10, in front of the shaft 12, two spaced pedestal-boxes 19 are erected, each pair of boxes being loosely engaged by the journals of a double-cranked counter-shaft 20, which duplicate shafts are thus held to rotate at right angles to the main shaft 12.

On the rearwardly-projecting end of each counter-shaft 20 a bevel-gear 21 is affixed, and these similar gears are meshed with like bevel-gears 22, secured upon the main shaft 12, one at each side of the double crank 12$^a$. Upon the duplicate guideways 23, which are arranged forwardly of the main shaft 12 and parallel thereto, duplicate slide-blocks 24 24$^a$ are loosely supported, so that they may reciprocate longitudinally in the same horizontal plane with the slide-block 16. Similar pitmen 25 loosely connect the double cranks of the counter-shafts 20 with the slide-blocks 24 24$^a$, and it will be seen that the described construction and arrangement of parts adapt the three slide-blocks 16 24 24$^a$ to reciprocate in unison when the main shaft 12 is rotated.

An edge-forming die 26, rectangular in cross-section, is removably secured to the slide-block 16, so as to project a suitable degree forwardly therefrom, one means for such a connection being shown by dotted lines in Fig. 1, consisting in the formation of a socket in the forward end of the slide-block for the reception of a reduced tenon that projects rearwardly from the die 26. In the flat front face of the die 26 two V-shaped grooves $b$ are formed, that cross each other at right angles at the center of said die and extend parallel with opposing sides of the die.

Two forming-dies 27 28 of like construction are respectively held to project toward each other from the slide-blocks 24 24$^a$ and may have each a tenon or crank $c$, similar to that on the die 26, projecting rearwardly therefrom to fit within sockets $c'$, formed in the adjacent ends of the slide-blocks 24 24$^a$. The peculiar formation of the die 27 is clearly shown in Figs. 7, 8, and 9, and its position is indicated in Figs. 1 and 3, at the left-hand side of the same, and as the dies 27 28 are duplicates a description of one will answer for both. The body of the die 27 is substantially rectangular in cross-section, and across its axis a horizontal channel $d$ is formed, which when the drill is to be operated upon receives one of the wings A' on the drill.

Adjacent to the end of the channel $d$ nearest to the face of the die 26 said channel is widened rearwardly by laterally sloping the back wall of the channel from a point $d'$, as shown in Fig. 7.

Upon the end of each die 27 28 and along the lower edge of the same a swell $e$ is formed, these protuberances being positioned at or near the front faces of the dies and projecting toward each other, having their vertical opposed faces sloped equally, so that when they have contact an angular space is afforded between said sloping surfaces, as clearly shown in Fig. 2.

When the working details of the machine are assembled for service, as shown in Figs. 1 and 2, the channels $d$ of the dies 27 and 28 lie in the same plane, so that they will readily take in the opposite wings A' on the cruciform body of the rock-drill in process of manufacture or being repaired.

A bracket-arm 29 is pivoted at one end upon the front of the frame 10 and may have a hooked engagement at its other end with a projection $g$ on the frame. The bracket-arm 29 is notched, as at $h$, on the upper edge thereof near the longitudinal center, which notch will be disposed directly opposite the front end of the die 26 when the bracket-arm is adjusted in a horizontal position, as shown in Figs. 1 and 4.

If a new drill is being made, of course the wings A' are first parallel on the opposite edges of the same throughout their length, and to spread these wings at and near the cutting edges, so as to afford necessary clearance in service, the operator heats the body of the drill a proper degree and while the machine is slowly running introduces the hot drill-body between the two dies 27 28, holding the drill in position on the bracket-arm 29 by its shank A, that projects from and between the dies. It is to be understood that forcible manual pressure is to be applied endwise upon the drill-shank that is grasped by the operator, so that the strokes of the upsetting-die 26 will be counteracted. The reciprocation of the die 26 causes its forward face to forcibly impinge upon the free ends of the wings A' on the rock-drill, so as to spread their front ends and at the same time sharpen the cutting edges on said ends. This action will also upset the free end portions of the wings A' and cause them to conform to the slopes $d'$ on the channels $d$, and thus give the necessary clearance to the drill. The operator while holding the drill in position slowly moves it rotatably to successively bring different pairs of opposite wings of the drill into the channels $d$ to enable the proper sloping of the widened portions of said wings.

In the formation of cutting edges on new drills or the sharpening of old drills that have been worn very blunt on their edges the swells $e$ on the forming-dies 27 28 are employed to speedily draw the edges of the drill into V shape. To this end the free ends of the wings A' of the drill after heating are successively held between the sloped faces of the swells $e$, that act as two fuller-dies, which by their impact upon opposite sides of the wing near its front end quickly draw the blunt ends of the drill-wings into V shape, as clearly indicated in Fig. 2.

As the drill body or shank is usually from fifteen to twenty feet long when in complete form, it may be supported at its outer end upon a rest of any kind, (not shown,) while the portion of the drill-shank near the wings, or in some cases the wings of the drill, rest upon the bracket-arm 29, thereby relieving the operator from supporting the weight of the drill and enabling him to with ease hold the drill in position and turn it to bring the wings of the drill successively within the channels $d$ or enter the ends of the wings successively between the swells $e$, as before explained.

Ordinarily to renew the cutting edges on rock-drills of the described construction it is only necessary to heat the drill-body and introduce it between the dies 27 28, so as to enter two of the wings A' properly within the channels $d$, the reciprocation of all the dies then spreading the wings at their free ends to normal width and at the same time sharpening the dull cutting edges of the same, the drill being changed in position by rotation, so as to bring all the wings A' successively into the channels $d$.

Having thus described my invention, I claim as new and desire to secure by Letters Patent—

1. The combination with a frame, a die-actuating device on said frame, comprising similar slide-blocks supported to move toward and from each other, a slide-block supported to reciprocate at right angles to the other slide-blocks, all the slide-blocks working in the same plane, a cranked main shaft, cranked counter-shafts rotatable at right angles to the main shaft, pitmen connecting said shafts with the slide-blocks, gearing connecting the main shaft with the counter-shafts, and means for rotating the main shaft, of forming-dies securable upon the alined slide-blocks, an edge-forming die securable upon the other slide-block, and a bracket-arm adjustable on the forward side of the frame, for support of a drill in the same plane with the dies.

2. In a drill-sharpening device, two forming-dies, each consisting of a tenoned block, horizontally channeled across its working face, the back wall of said channel being sloped to widen it toward the rear end, and a fuller projection on the lower edge of the working face of the die, and having its upright face sloped from the rear forwardly.

WILLIAM J. EVANS.

Witnesses:
WILLIAM T. HOAR,
RICHARD KEARNEY.